United States Patent [19]

Wittmann

[11] Patent Number: 4,695,767

[45] Date of Patent: Sep. 22, 1987

[54] SINGLE-ENDED FLUORESCENT LAMP-BASE COMBINATION

[75] Inventor: Horst Wittmann, Stadtbergen, Fed. Rep. of Germany

[73] Assignee: Patent Treuhand Gesellschaft für elektrische Glühlampen mbH, Munich, Fed. Rep. of Germany

[21] Appl. No.: 789,638

[22] Filed: Oct. 21, 1985

[30] Foreign Application Priority Data

Oct. 25, 1984 [DE] Fed. Rep. of Germany ....... 3439171

[51] Int. Cl.⁴ ................................................ H01J 7/44
[52] U.S. Cl. ........................................ 315/58; 313/318; 313/493; 313/634; 315/62; 315/71; 439/236
[58] Field of Search ............................ 315/58, 62, 71; 339/91 L; 313/318, 493, 634

[56] References Cited

U.S. PATENT DOCUMENTS

| | | | |
|---|---|---|---|
| 4,215,456 | 8/1980 | Buunk | 313/318 |
| 4,270,071 | 5/1981 | Morton | 315/58 |
| 4,375,607 | 3/1983 | Morton et al. | 315/62 |
| 4,536,676 | 8/1985 | Maruyama et al. | 313/318 |
| 4,547,704 | 10/1985 | Brinn et al. | 315/71 |

*Primary Examiner*—Harold Dixon
*Attorney, Agent, or Firm*—Frishauf, Holtz, Goodman & Woodward

[57] ABSTRACT

To reliably attach a connection lead (12) to a screw-in sleeve (9) fitted over a connection portion (3) of a base body (1) which retains parallel legs of a compact fluorescent lamp (5), the current supply lead is bent over in a groove (13) formed at an end face of the connection portion (3) and carried along parallel thereto at the inside of the screw-in sleeve, to provide for reliable electrical and mechanical connection, and retained in position by a punch retention of the screw-in sleeve on the connection portion (3) of the base body.

8 Claims, 2 Drawing Figures

SINGLE-ENDED FLUORESCENT LAMP-BASE COMBINATION

The present invention relates to a single-ended, low-pressure mercury vapor discharge lamp with a screw-in base, particularly of the generally U-shaped tube fluorescent lamp type with a standard Edison screw-in connection, so that the fluorescent lamp-base combination can function as a direct replacement for a standard incandescent lamp.

BACKGROUND

Fluorescent lamps which can directly replace incandescent lamps provide substantial savings in electricity. Such lamps, known also as compact fluorescent lamps, are well known in various types and of various constructions. One or more discharge vessels which, for example, may be U-shaped or have connected parallel leg portions, are secured to a base which retains therein electrical circuit components for starting and operation of the lamp. The base is terminated by a metallic screw base, so that the lamp as constructed can be used as a direct replacement for an incandescent lamp. The terminal elements of the base sleeve usually are formed as a metallic threaded or spirally deformed sleeve to form a sleeve terminal and a central or button or base terminal. One connecting lead from the discharge vessel is connected to one of the base terminals and a connection lead to the accessory equipment, for example a ballast, and the starter circuit is connected to another one of the base terminals. The connection itself is usually done by soft solder.

Soft soldering of lamp connections to the base terminal elements is well known. In the specific lamps involved, however, and in which accessory equipment is retained within a hollow portion of the base, it has been found that poorly formed solder joints may result. Upon testing, such lamps are rejected and must be returned to a production line, or manually repaired, which is expensive and requires additional and skilled personnel. Usually, the center terminal can be properly soldered by automatic machinery; the difficulty frequently arises on the side or sleeve or screw contact element in the base. The entire unit—discharge vessel, base and terminal assembly—is frequently handled by a machine upside down, that is, the button facing upwardly. Thus the center terminal can usually be reliably soldered without difficulty. Only the side terminal requires reworking.

THE INVENTION

It is an object to improve a compact low-pressure mercury vapor discharge lamp, such as a compact fluorescent lamp, so that the terminal connection to a screw-sleeve base terminal can be reliably effected, and which can be carried out in an automatic production machine.

Briefly, one of the current connection leads is positioned between the wall portion of a connecting attachment or connecting sleeve formed on the base and a threaded or spirally deformed screw-in terminal sleeve which is then slipped thereover and retained on the base portion. The current supply lead, thus, will be clamped by the screw-in base sleeve against the wall portion of the base, to be pinched therebetween, and thus form a mechanically stable and electrically reliable tight connection between the current supply lead from the lamp and/or the accessory circuit, respectively, and the socket terminal.

By clamping the current supply lead between the base body and the base sleeve, the terminal wire will be retained in position without chance of sliding movement, and without being subjected to mechanical forces when the lamp is screwed into a socket other than, possibly, being pressed against the engaging screw-in sleeve even tighter. Preferably, the base body, at the portion remote from the connection to the discharge vessel, is formed with a groove into which the connecting wire can be placed so that the connecting wire will be retained at a predetermined location on the base body while the screw-in sleeve is pressed thereon, or otherwise secured thereto e.g. by punching. The groove, preferably, is formed in a facing end surface of a hollow cylindrically shaped portion of the base. The groove may, however, also be formed in or extend into the outer circumferential surface of the base body, but shallow enough to permit some projection of the wire above the surface of the groove so that, by frictional engagement, a tight connection between the screw-in terminal and the connecting wire will be effected. The base sleeve is preferably secured to the base body—typically of insulating plastic material—by a deforming tool, such as a punch or the like, which can be readily so arranged that, at the same time, the current supply lead extending from the inner wall of the base is clamped between the wall of the base and the connecting sleeve. Alternatively, the extending portion of the insulating base body, preferably formed as a hollow cylindrical part, can be supplied with an external thread corresponding to that of the screw-in base sleeve, so that the screw-in sleeve can be threaded on the base and, at the same time, the connecting wire, located in a shallow groove, is retained in position and clamped against the screw-in sleeve to provide for reliable electrical contact.

The construction has substantial manufacturing advantages, which are paticularly important in the manufacture of single-ended, single-based compact fluorescent lamps. The current supply can be easily mounted, and thus automated machinery can apply the connecting sleeves reliably, without error or malfunction, so that the overall construction will be low in price. Manual after-work of poorly made or defective solder connections between the current supply lead and the lateral contact terminal sleeve is no longer needed. The groove, which is preferably formed in the insulating portion of the base and which retains the current supply lead, prevents shift of the current supply lead upon attachment of the screw-in base sleeve, so that the connecting wire is automatically clamped as the screw-in sleeve is secured to the insulating base body, thereby—merely by attachment of the screw-in sleeve to the base body—effecting the electrical connection of the connecting lead while insuring high electrical engagement force which remains reliable for a long period of time.

DRAWINGS

FIG. 1 is a schematic longitudinal cross section through a base for a single-ended fluorescent lamp; and FIG. 2 is a fragmentary cross-sectional view, to an enlarged scale, of the lower portion of the base, with the base sleeve removed.

DETAILED DESCRIPTION

Figure 1:
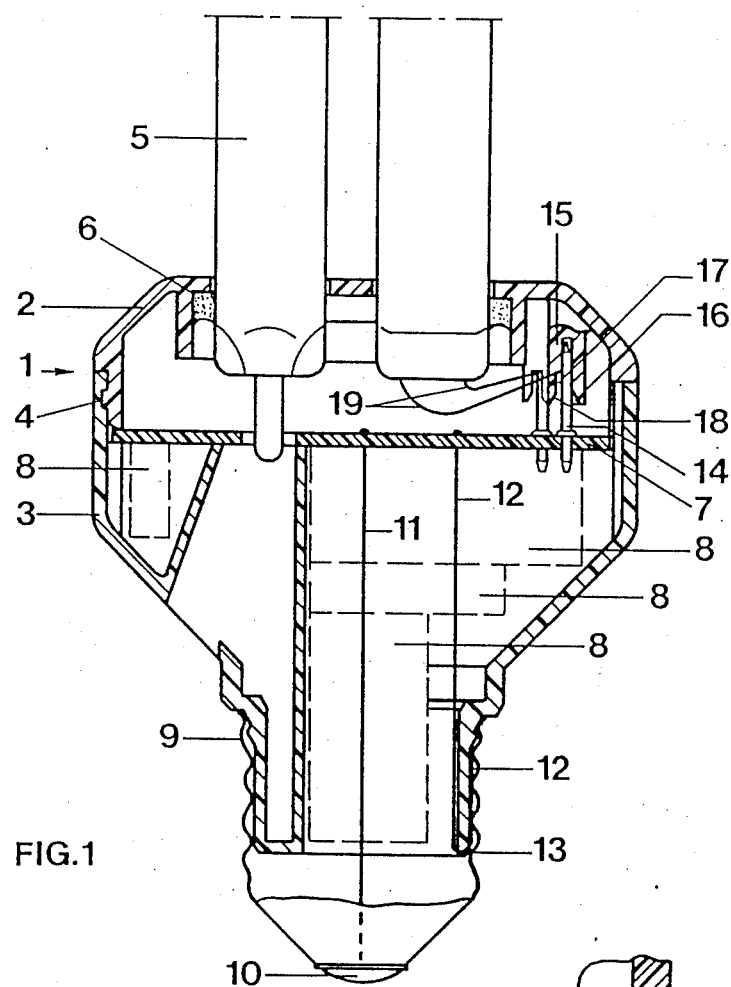

The base 1 is hollow; it is made of plastic material and is formed in two portions, namely a portion 2, receiving the discharge vessel 5, and a portion 3, which terminates in a tubular hollow end, 3a and which forms a connecting portion. The connecting portion 3a is surrounded by a threaded screw-in sleeve 9, adapted to be screwed into an ordinary lamp socket.

A snap connection 4 mechanically retains the lamp receiving portion 2 and the connecting portion 3 of the base together; the snap connection 4, once snapped together, retains the elements such that they cannot be removed without, effectively, destroying the base. A discharge vessel 5, which is of known construction and, for example, may include a single U-bent tube, or two parallel tubes which are connected by a cross connection, has its end portions seated in the upper portion 2 of the base and retained therein by hardened retention cement 6. The discharge vessel 5 is shown only schematically and fragmentarily since its actual construction forms no part of the present invention. Two U-shaped discharge vessels, or a larger number than two parallel legs, may be connected together, thus extending the length of the discharge path. The base can be sufficiently large to receive, for example, four parallel legs of a discharge vessel 5, located, for example, in a square configuration, when looked at from the top. The number of discharge vessels within the base 1, thus, can be selected as desired, in accordance with required light output.

A holding and assembly plate 7 is located in the hollow space of the base 1, for example forming part of the lower portion 3 of the base 1. The plate 7 is a support plate on which a ballast and ignition arrangement and circuit component 8 may be secured. Usually, an inductive balance and a starter may be used or, alternatively, an electronic accessory circuit may be used. In accordance with one embodiment, the plate 7 is a printed circuit board or conductor plate, on which respective electronic components of a high frequency accessory circuit are located. High-frequency operating and accessory circuits have the advantage that lamps operated thereby provide a higher light output than lamps operated at standard power current frequency. Additionally, the weight of electronic circuit components is substantially less than the weight of ballast operating at, for example, 60 Hz.

A base screw-in sleeve 9, typically of metal, is secured to the lower tubular projecting, essentially cylindrical wall portion or part 3a of the portion 3. The screw-in sleeve 9 is of the type used, customarily, for incandescent lamps and has a standard screw thread. The screw-in sleeve 9 permits direct connection of the compact lamp into the socket of a light fixture which, then, can be used selectively as desired by the user with incandescent lamps or with a compact fluorescent lamp. A base terminal 10 is provided, to which a first current supply lead 11 is connected by soldering. Current supply lead 11 extends through the hollow lower region 3a of the lower portion 3 of the base 1 towards the support plate 7. Connecting the lead 11 to the center or button terminal 10 does not form any problem, even under mass-production conditions.

Figure 2:
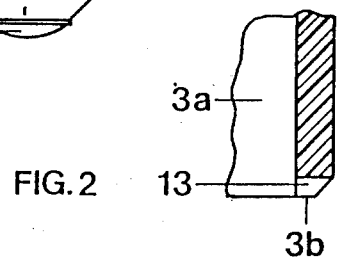

In accordance with a feature of the invention, a second current supply lead 12 extends from the support plate 7 through the hollow space in the lower region 3a of the lower portion 3. The current supply lead 12 is carried around the lower edge 3b of the end region 3a of the lower portion 3 by being bent thereover, outwardly, and then, again, bent upwardly, to result in a generally U-shaped structure, of which one leg is engaged by the inner surface of the metallic screw-in sleeve 9. In accordance with a preferred feature of the invention, the region 3a, and especially the edge 3b of the lower portion 3 of base 1 is formed with a groove or notch 13 (see FIG. 2), at the circumferential location where the wire 12 extends on the inside, so that the wire 12 can be fitted to lie in the groove 13. After attachment and deformation of the base sleeve 9, for example by punching, the wire 12 is reliably retained in the groove 13 and tightly engaged against the inside of the metallic sleeve 9, by being clamped between the sleeve 9 and the outer wall or surface of the end region 3a of the base portion 3, over which the sleeve 9 is secured. The electrical connection, as well as mechanical retention in position between the wire 12 and the sleeve 9, thus is reliable and excellent.

Electrical connection between the wires 19 extending from the discharge vessel 5 and the ballast or other circuit components secured to the support plate 7 is effected by contact pins 14, passing through the support plate 7. Thus, the contat pins 14 form an electrical connection between all elements in the lower portion 3 of the base 1 and elements in the upper portion 2 of the base 1. The pins 14 are press-fitted into the plate 7, or are soldered therein, if surrounding an electrical circuit track. They are connected with the circuit tracks of the support plate 7 in a suitable manner to provide electrical connection, for example, to a starter and/or a ballast and other circuit components, shown schematically only at 8. The upper portion 2 of the base 1 has bushings 15 formed thereon which have lower openings, formed with an engagement funnel or entrance portion 16. The funnel-shaped entry portion 16 facilitates mechanical fitting of the contact pins 14 into a blind hole, formed concentrically with respect to the bushing 15. Bushing 15, further, is formed with a slit 17 tangential to the blind hole in the bushing 15. The slit 17 is formed with an insertion inclination surface 18. The inclined surface 18, also, facilitates automatic insertion of the current supply leads 19 from the discharge vessel 5 into the slit 17.

Upon assembly, the discharge vessel 5 is first seated in the upper portion 2 of the base 1, and cement 6 is introduced. When the discharge vessel 5 is connected to the upper portion of the base 1, current supply leads 19 from the discharge vessel 5 are inserted into the slits 17 of the bushings 15. The contact pins 14—as noted above—were previously attached to the support plate 7. When the support plate 7, coupled to the lower part 3 of the base 1, is snapped into the upper part 2, the terminal pins 14 will be press-fitted into the blind holes formed in the bushings 15, thereby simultaneously reliably and inseparably locating the current supply leads 19 which had previously been introduced into the slit 17.

The assembly, of course, similarly permits connection of all connecting pins 14, for example four connecting pins, and of current supply leads 19. Only two connecting pins 14 and current supply leads 19 are shown in the drawing for clarity.

Various changes and modifications may be made within the scope of the inventive concept.

I claim:

1. Single-ended low-pressure mercury vapor discharge lamp—and—base combination, particularly compact fluorescent lamp, comprising at least one discharge vessel (5) formed by at least two parallel legs;

current leads (19) extending from said discharge vessel;

a hollow base body (1) having a first portion (2) for receiving the discharge vessel said legs of the discharge vessel (5) being secured to the receiving portion of the base body, the base body further having an electrical connection, an at least partly metallic screw-in terminal (9);

an accessory circuit (7, 8) secured to the base body, said accessory circuit having current leads (11, 12) extending therefrom, and including means (14, 16) for connection of the current leads (19) of the discharge vessel (5) to the accessory circuit;

wherein the electrical connection portion (3) of the base body (1) includes an essentially cylindrical, internally hollow projecting wall portion (3a) extending to the vicinity of the bottom end of the screw-in terminal (9);

at least one (12) of the current connection leads (11, 12) extends through the hollow projecting wall portion (3a) around the hollow projecting wall portion and then adjacent the outer surface of said projecting wall portion (3a) of the base body (1), the screw-in terminal (9) being secured over said essentially cylindrical projecting wall portion and pinching and clamping part of the at least one connection lead (12) between the screw-in terminal (9) and the outer surface of the essentially cylindrical wall portion of the base body; and wherein the screw-in terminal (9) is secured to the outer surface of the essentially cylindrical wall portion (3a) of the base body (1) by punch deformation, while simultaneously clamping and pinching the at least one current connection lead (12) in position to form a mechanically stable, immovable, and electrically tight connection between said at least one current connection lead (12) and the screw-in terminal (9).

2. The combination of claim 1, wherein the receiving portion (2) and the electrical connection portion (3), including said essentially cylindrical projecting wall portion (3a) of the hollow base body comprise plastic material.

3. The combination of claim 1, wherein the esentially cylindrical projecting wall portion (3a) is formed with a groove 13) receiving and locating the at least one current connection lead (12) therein.

4. The combination of claim 3, wherein at least a portion of the groove is formed in the terminal end (3b) of the hollow projecting wall portion (3a), and the at least one current connection lead (12) is bent back upon itself in U-shaped manner, the bend of the U being located in said groove.

5. The combination of claim 4, wherein the receiving portion (2) and the electrical connection portion (3) including said essentially cylindrical projecting wall portion (3a) of the hollow base body comprise plastic material.

6. The combination of claim 3, wherein the receiving portion (2) and the electrica connection portion (3) including said essentially cylindrical projecting wall portion (3a) of the hollow base body comprise plastic material.

7. The combination of claim 1, further including a printed circuit board (7) fitted within the hollow base body and, at least in part, retaining said accessory circuit.

8. The combination of claim 7, wherein the receiving portion (2) and the electrical connection portion (3) including said essentially cylindrical projecting wall portion (3a) of the hollow base body comprise plastic material.

* * * * *

UNITED STATES PATENT AND TRADEMARK OFFICE
CERTIFICATE OF CORRECTION

PATENT NO. :   4,695,767

DATED      :   Sept. 22, 1987

INVENTOR(S) :  Horst WITTMANN

It is certified that error appears in the above-identified patent and that said Letters Patent is hereby corrected as shown below:

Column 5, claim 1, line 10, after "connection" insert -- portion (3) --

Column 6, claim 6, line 2, "electrica" should be -- electrical

Signed and Sealed this

Twenty-sixth Day of April, 1988

Attest:

DONALD J. QUIGG

Attesting Officer

Commissioner of Patents and Trademarks